June 6, 1967   J. H. HOLLYDAY   3,323,817
HUB
Filed Nov. 25, 1964
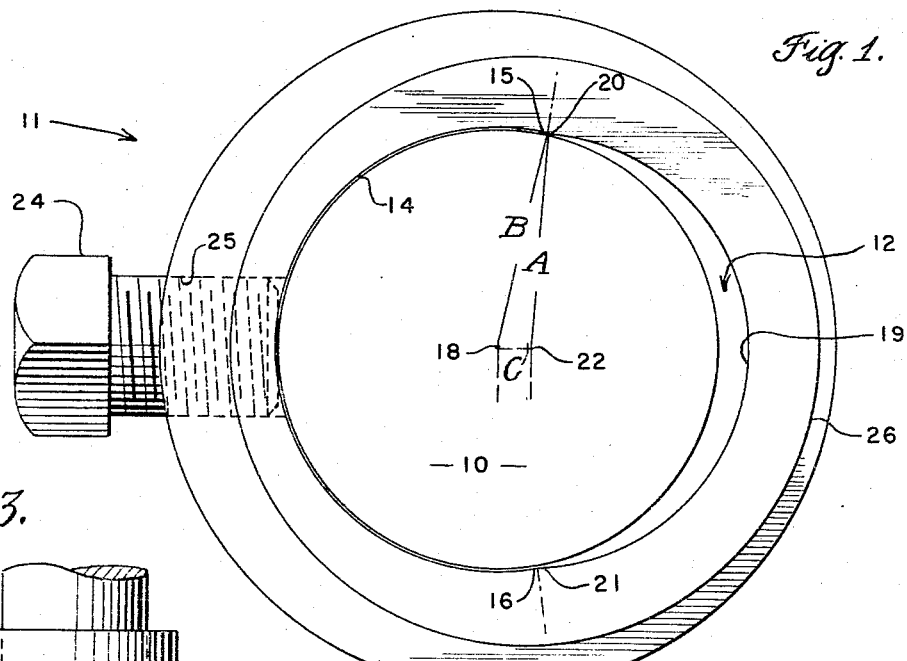
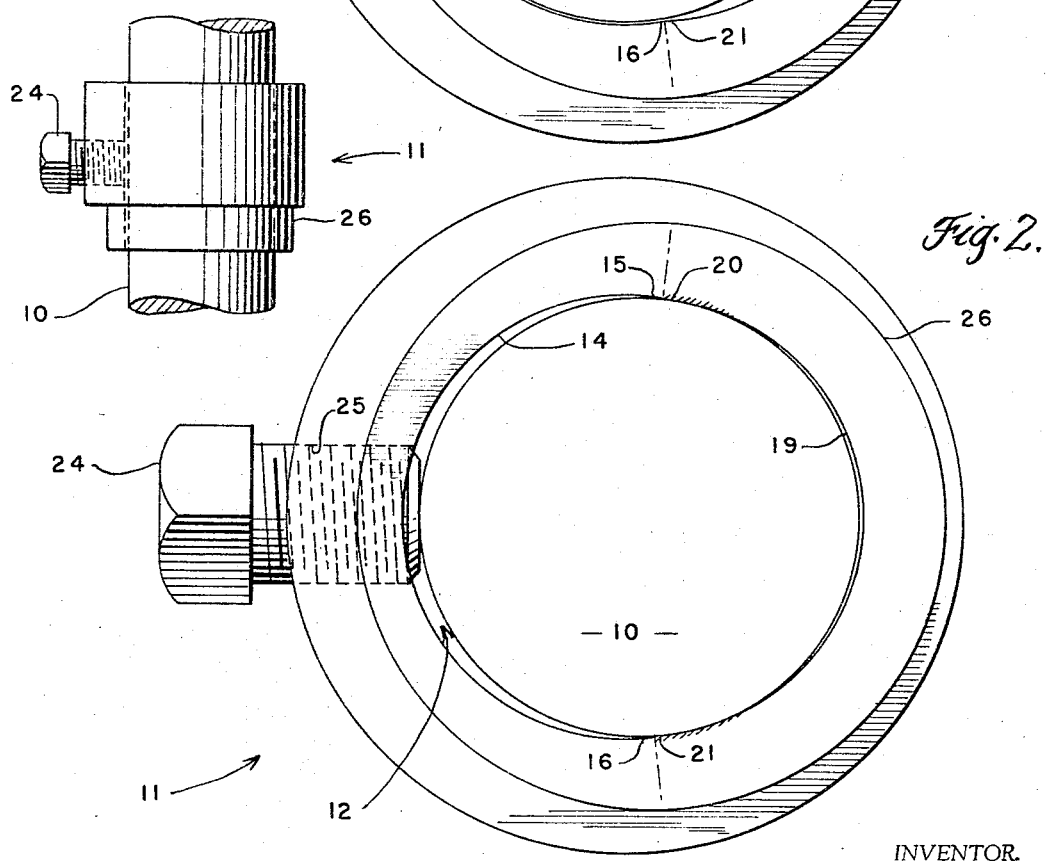
INVENTOR.
JAMES H. HOLLYDAY
BY Walter V. Wright
AGENT United States Patent Office 3,323,817
Patented June 6, 1967

3,323,817
HUB
James H. Hollyday, New Holland, Pa., assignor to Sperry Rand Corporation, New Holland, Pa., a corporation of Delaware
Filed Nov. 25, 1964, Ser. No. 413,876
1 Claim. (Cl. 287—52.08)

This invention relates generally to the mounting of a member, such as a sprocket hub, a stop-ring, or the like, on a shaft.

Two of the many known methods of clamping a member, such as a hub, to a shaft are by the use of set screws or the like and by the use of a press fit relationship between a hub bore and the shaft.

In essence, the first of these two methods involves the inserting of a shaft in a hole which is larger than the shaft and then pinching the shaft at two diametrically opposed points; one of the points being the set screw and the other point being the point of engagement of the shaft with the wall of the hole diametrically across the shaft from the set screw. This is basically a relatively weak clamping relationship whose clamping strength varies from one application to the next depending on how tight the set screw is drawn. The second above mentioned method, in essence, involves the forcing of a shaft of given size into a hole too small to readily receive the shaft. This causes deformation of the material of one or both of the parts, usually the hub, and causes a clamping action between the parts which is relatively strong and of determinable magnitude. This method requires the use of special hub pressing tools, and is not practical when the hub is to be located a considerable distance from the end of the shaft.

In some mechanisms, such as agricultural machinery for example, there are many instances where a clamping action superior to that of the set screw is desirable, if not essential; while the accessibility of the parts, or the lack of availability of special equipment for in the field repairs, prohibits the use of a press fit type hub mounting.

It is an object of this invention to provide means for mounting a hub or the like on a shaft with a clamping action superior to that of a set screw while requiring no tools other than a conventional set screw wrench.

It is another object of this invention to provide means for mounting a hub or the like on a shaft with a clamping action similar to that of a press fit, but without the need for special assembling equipment.

It is another object of this invention to provide means for mounting a hub or the like on a shaft with a clamping action similar to that of a press fit, but which may be readily assembled in the field or in a crowded environment which would prohibit the use of a hub pressing tool.

It is another object of this invention to provide means for mounting a hub or the like on a shaft with a clamping action similar to that of a press fit, but which enables mounting of the hub at any desired position along the length of the shaft.

It is another object of this invention to provide means for mounting a hub or the like on a shaft in a manner similar to that of a conventional set screw, but wherein the strength of the joint is theoretically determinable and relatively uniform from one application to the next.

It is another object of this invention to provide means for mounting a hub or the like on a shaft which is rugged, mechanically simple and capable of manufacture at low cost.

These and other objects and advantages of this invention will be apparent upon reference to the following description and claim taken in conjunction with the accompanying drawings wherein:

FIG. 1 is an end view of a shaft showing the device of the present invention in the initial stage of being mounted on the shaft;

FIG. 2 is a view similar to FIG. 1 showing the device of the present invention in an intermediate stage, approaching the final stage, of being mounted upon a shaft; and FIG. 3 is a side view, to a reduced scale, showing the hub member of the present invention mounted on a shaft.

Referring now to the drawings in detail, the reference numeral 10 indicates a shaft or the like having a predetermined diameter. The reference numeral 11 indicates, generally, a device, such as a hub or the like, adapted to be mounted on shaft 10. The hub has an axial bore of non-circular cross sectional configuration indicated generally by the reference numeral 12. The bore 12 of hub 11 has two co-extending arcuate wall portions. A first arcuate wall, or surface, portion of bore 12 is indicated by the reference numeral 14. Arcuate surface 14 has terminal portions respectively indicated by the reference numerals 15 and 16. The terminal portions 15 and 16 of arcuate surface 14 are spaced apart angularly in excess of one hundred eighty degrees. In FIG. 1, the center of curvature of surface 14 is indicated by the reference numeral 18, and the radius of curvature B of surface 14 is greater than the radius of curvature of the surface of shaft 10 upon which the hub is intended to be mounted. Bore 12 has a second portion, or arcuate surface, 19 having terminal portions 20 and 21 which respectively join the terminal portions 15 and 16 of first arcuate surface 14. The terminal portions 20 and 21 of arcuate surface 19 may be spaced apart angularly slightly in excess of one hundred eighty degrees, although the angular length of surface 19 may be less than one hundred eighty degrees as shown in FIGS. 1 and 2. The center of curvature of arcuate surface 19 may be seen in FIG. 1 at 22. The radius of curvature A of surface 19 is preferably a few thousandths of an inch less than the radius of curvature of the surface of shaft 10, although it could be the same as the radius of shaft 10. It will be apparent in FIG. 1 that the shaft 10 is readily insertable axially into bore 12 substantially coaxially with first arcuate surface 14 and with the second arcuate surface 19 lying alongside the shaft and spaced transaxially therefrom. The size and configuration of surface 14 is not really of a critical nature so long as it is such as to enable ready insertion of shaft 10 into bore 12.

In the initial stage of mounting illustrated in FIG. 1 there is no clamping action between hub 11 and shaft 10. The shaft and hub are freely movable relative to each other in the direction of the axis of shaft 10. Clamping action between the shaft and hub is effected by means such as a set screw 24 carried by hub 11 in a threaded aperture 25 which opens onto arcuate surface 14 and has an axis perpendicular to the axes 18 and 22 of surfaces 14 and 19. Preferably, the aperture 25 is disposed so that set screw 24 is symmetrical to a plane common to the parallel but spaced apart axes 18 and 22. It will be apparent in FIG. 1 that such a plane would also bisect both the first arcuate surface 14 and the second arcuate surface 19. If two or more set screws 24 are employed, they should preferably be arranged symmetrically relative to the aforementioned plane. This symmetrical arrangement is in the nature of a preference, not necessarily a critical relationship.

Upon rotation of set screw 14 in one direction, it moves transaxially into bore 12 toward second arcuate surface 19. This effects transaxial relative movement between shaft 10 and hub 11 and drives the shaft transaxially into pinching engagement between the terminal portions 20 and 21 of second arcuate surface 19. The angle of engagement between the surface of shaft 10 and the terminal portions of arcuate surface 19, coupled with the mechanical advantage of the set screw threads, provides sufficient transaxial force to cause the arcuate surface 19 to deform in the areas of its terminal portions and receive shaft 10 therein. The set screw 24 is turned until the surface of shaft 10 is in full surface to surface contact with second arcuate surface 19 of bore 12. This condition is being approached, but has not yet been achieved, in the FIG. 2 showing of the invention. When surface to surface engagement is achieved between shaft 10 and arcuate portion 19 of bore 12, a clamping relationship approaching that of a press fit is provided. For known materials manufactured within known tolerance limits, the actual clamping force between the parts is determinable and relatively constant from one application to the next with the full surface engagement relationship between shaft 10 and surface 19 acting as a visual indicator of how far to draw set screw 24. The gripping action between the hub and shaft is not limited to two points as in the case of a conventional set screw. The gripping force is applied to the shaft 10 at set screw 24 and throughout the entire arcuate surface 19, since the radius of curvature of this surface is initially less than that of the surface of shaft 10. The clamping force on shaft 10, however, is maximum in the areas of terminal portions 20 and 21 of arcuate surface 19.

Referring to FIG. 1, when the shaft and hub are completely assembled in full clamping relation, the center or axis of shaft 10 lies between the axes 18 and 22 of arcuate surfaces 14 and 19. This center is indicated by the letter C in FIG. 1. The final position of the axis C of shaft 10 is to the left (FIG. 1) of axis 22 an amount substantially equal to the difference between the radius of shaft 10 and the radius of curvature of arcuate surface 19, which is normally a few thousandths of an inch.

Referring to FIG. 3, it will be seen that hub 11 has a shoulder portion 26 of reduced diameter relative to the main axial body of the hub. This surface may carry a bearing race, or have welded thereon a sprocket, pulley, gear or the like. When the device is clamped to a shaft, the surface 26 may be slightly deformed to an out of round condition as a result of the stressing of bore surface 19. In most cases, such as when a sprocket or pulley is used to complete the assembly, the deformation of surface 26 is negligible. Under more critical circumstances, such as a gear or bearing mounting, it would be preferable in the manufacturing operation to mount hub 11 on a mandrel of the same diameter as the shaft upon which it will be finally mounted, and machine surface 26 to the exacting dimensions required with the hub 11 under stress. This will result in the surface 26 being round and concentric to the center C of the shaft 10 when the part is finally mounted on the shaft.

One method of forming the bore 12 would be to first drill or bore an axial hole in hub 11 of radius B on center 18, then drill or bore a second overlapping hole of radius A on center 22.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claim.

Having thus described my invention, what I claim is:

A hub adapted for easy and secure attachment to a shaft or the like of predetermined diameter, said hub comprising a unitary annular member having a central bore extending axially therethrough, said bore having a first arcuate surface concentric to a predetermined axis and having a radius of curvature greater than that of the surface of said shaft, said first arcuate surface having terminal portions spaced apart angularly in excess of one hundred eighty degrees, said bore having a second arcuate surface concentric to an axis parallel to and spaced from said predetermined axis and having a radius of curvature less than that of the surface of said shaft, said second arcuate surface extending through said annular member from one axial end thereof to the other, said axes lying in a common plane bisecting both said first and second arcuate surfaces, said second arcuate surface having angularly spaced terminal portions respectively joining said first surface terminal portions, said shaft being readily axially insertable in said bore substantially coaxially with said predetermined axis and to one side of said second surface, a threaded aperture opening into said first arcuate surface and extending radially through one side of said annular member symmetrically relative to said plane, a screw operable in said threaded aperture to engage a shaft disposed in said bore coaxially with said predetermined axis and drive said shaft and said hub relatively transaxially to move said shaft into full surface engagement with said second arcuate surface thereby wedging said shaft between said terminal portions of said second arcuate surface, with one end of said annular member including a reduced cylindrical portion providing a shoulder and having an exterior cylindrical surface whose center of curvature lies in said common plane and between said axes and coincides with the axis of said shaft when the shaft is in full surface engagement with said second arcuate surface.

References Cited

UNITED STATES PATENTS

| | | | |
|---|---|---|---|
| 707,259 | 8/1902 | Rueger | 287—52.09 X |
| 780,850 | 1/1905 | Williams | 287—52.08 |
| 876,052 | 1/1908 | Haskins | 287—52.09 X |
| 1,171,525 | 2/1916 | Lampert. | |
| 3,094,009 | 6/1963 | Wentling | 287—52.08 X |

CARL W. TOMLIN, *Primary Examiner.*

A. V. KUNDRAT, *Assistant Examiner.*